Patented Oct. 20, 1931

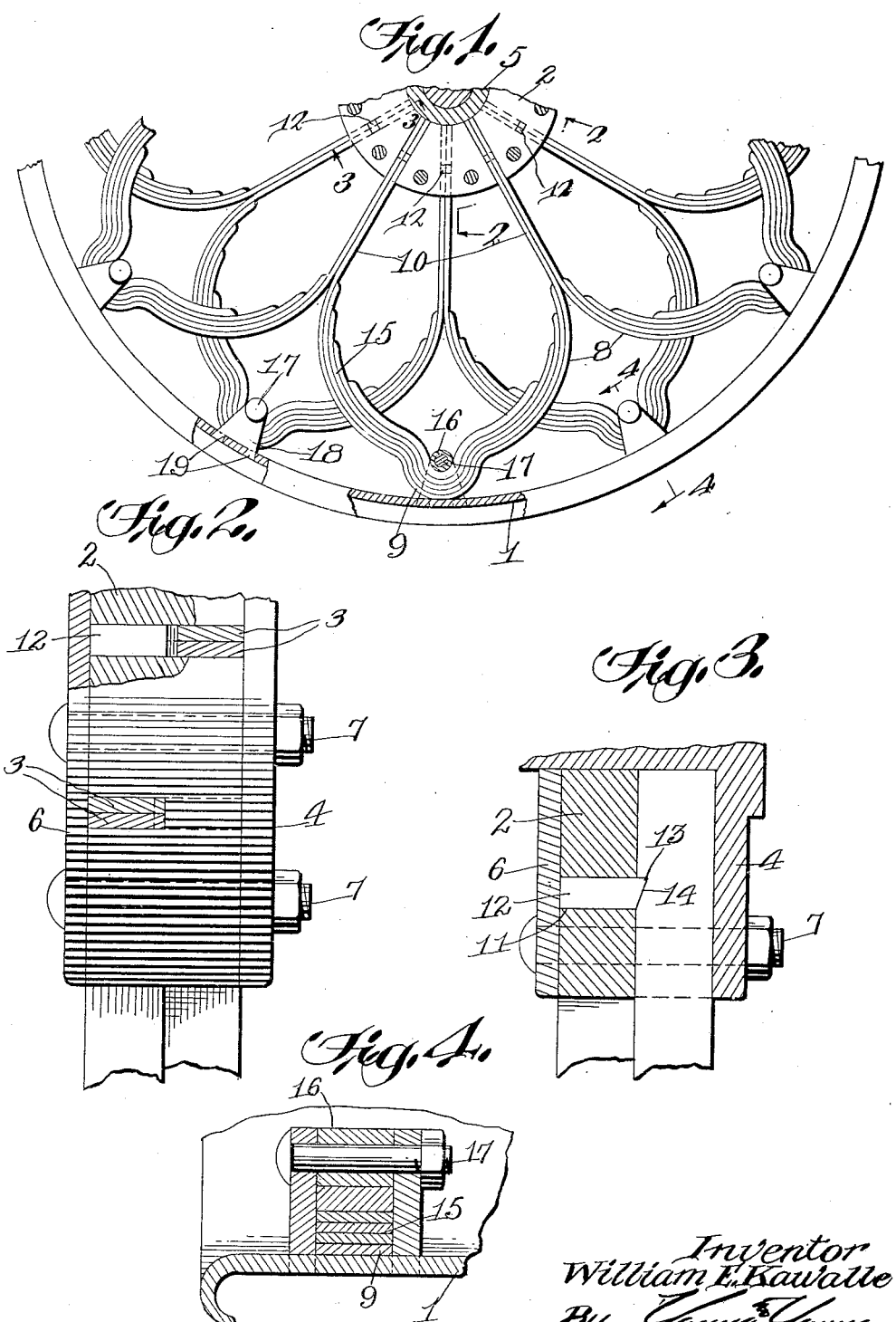

1,828,322

UNITED STATES PATENT OFFICE

WILLIAM E. KAWALLE, OF MANITOWOC, WISCONSIN

SPRING WHEEL

Application filed August 9, 1929. Serial No. 384,563.

This invention relates to new and useful improvements in spring wheels.

One of the objects of my invention is the provision of a spring wheel which can be used for motor vehicles and other traction vehicles for replacing or to be used in conjunction with the pneumatic tire in use at the present time, and the spring members are so arranged as to readily absorb any shock or jar imparted to the wheel at any point on its perimeter.

Another object of my invention is the provision of a spring wheel which includes in its construction a novel arrangement of the springs, whereby to absorb any shock or jar at any point on the wheel whether it be in the center of the rim or on one side thereof, and includes novel means for detachably retaining the spring members in position.

A further object of the invention is the provision of a spring wheel including substantially U-shaped spring members with improved hub members for receiving the ends of adjacent spring members and wherein the hub carries a locking dog adapted to engage the ends of the spring members in adjacent pairs so as to securely lock the ends of the spring within the hub.

A still further object of my invention is the provision of a spring wheel so constructed and arranged that should any of the springs become broken they can be quickly and easily replaced, and when the springs are in position they are securely locked against movement both to the felly and the hub of the wheel.

With the above and other objects in view, the invention consists in the novel features of construction, the combination and arrangement of parts hereinafter more fully set forth, pointed out in the claim and shown in the accompanying drawings wherein:

Figure 1 is a side elevation, illustrating a portion of a vehicle wheel constructed in accordance with my invention with parts thereof broken away and illustrated in cross section;

Figure 2 is a section on the line 2—2 of Figure 1;

Figure 3 is a section on the line 3—3 of Figure 1; and,

Figure 4 is a section on the line 4—4 of Figure 1.

Referring more particularly to the drawings, 1 indicates the rim of the wheel and 2 indicates in general the hub. The hub 2 is provided upon opposite sides thereof with radial recesses 3, the recesses upon one side of the hub being arranged alternately between the recesses on the other side of the hub. The hub block 2 is positioned between an integral annular flange 4 on the bearing sleeve 5, and the removable plate 6 with securing bolts 7 passing through the flange 4, the plate 6 and the hub block 2.

As illustrated in Figure 1, the spring members are arranged in series upon opposite sides of the central portion of the wheel and each spring member comprises an outer single member 8, the intermediate portion of which is arcuate, as shown at 9 with the ends extending in a curved line inwardly and arranged in converging relation at 10 with the ends thereof arranged in the spaced recesses 3, one end of each spring being arranged in opposed recesses and juxtaposition with an adjacent end of the next spring member in order. In order to retain the ends of the spring members in position with the recesses 3, the hub block 2 is provided upon each side thereof and between the recesses with apertures 11 for receiving the locking pins 12, thus it will be noted that the pins 12 are passed through apertures in one side of the hub lock and have their tapered or pointed end portions 13 engaged within saw toothed notches 14 in the ends of the spring members.

From this, it will be apparent that after the rest of the spring members have been placed in position, the locking pins 12 can be inserted through apertures 11 and engaged with the ends of the pins. These pins are held in place by means of the flange 4 and the circular locking plate 6.

In order to provide a wheel of sufficient strength to withstand a considerable load, the spring members 8 have arranged on the main body portion of the spring a plurality of laminations 15 which are shaped to conform with the shape of the main spring member, and it is preferred to have the innermost laminations somewhat heavier than the other laminations in order to withstand the pressure and wear of the fastening member which connects the spring members to the rim 1. This fastening member includes a sleeve 16 mounted on the bearing bolt 17, the ends of the bolt carried by substantially triangularly shaped members 18 having spaced lugs 19 with the base thereof and adapted to be inserted through suitable apertures in the rim 1 with the outer ends upset or overturned in order to prevent withdrawal of the lugs 19 after being placed in position.

It will be apparent from the foregoing that I have provided a simple and inexpensive spring wheel wherein substantially U-shaped spring members are used with their intermediate portions attached to the rim in alternative or staggered relation upon opposite sides of the center of the rim and the ends thereof are detachably secured to the hub block in such manner as to permit quick detachment of the ends of the springs when it is desired to remove any of them.

By arranging the spring members in the manner illustrated, all shock or jar which is imparted to the wheel through the striking of an object in the path of the wheel will be absorbed by the spring members and not be conveyed to the hub and thence to the body of the vehicle.

It will also be noted that by arranging the ends of the spring members so that the adjacent ends of adjacent spring members will be positioned in a single recess, the locking pins 12 can be used for locking two adjacent spring members in position.

While I have shown and described the preferred embodiment of my invention, it will be apparent that slight changes may be made in the construction when putting the invention into practice without departing from the spirit of the same or the scope of the appended claim.

I claim:

A spring wheel including a hub having radially disposed recesses upon opposite faces thereof and in staggered relation, each recess being intercepted by a key aperture, spring units arranged in overlapping relation upon opposite sides of the peripheral center of the hub, the ends of said spring members being positioned in the hub recesses, each having a saw toothed notch in one edge thereof, a locking key fitted into each hub aperture having an inclined end face for engagement with the saw toothed notch of the spring member for locking the end thereof within the hub, and a plate secured to one face of the hub for maintaining the locking keys in their assemblage with relation to the spring members.

In testimony that I claim the foregoing I have hereunto set my hand at Manitowoc, in the county of Manitowoc, and State of Wisconsin.

WILLIAM E. KAWALLE.